US011063863B2

(12) United States Patent
van Brandenburg et al.

(10) Patent No.: US 11,063,863 B2
(45) Date of Patent: Jul. 13, 2021

(54) SYSTEMS AND METHODS FOR TRANSMITTING AND RECEIVING INTEREST MESSAGES

(71) Applicants: Koninklijke KPN N.V., Rotterdam (NL); Nederlandse Organisatie voor Toegepast-Natuurwetenschappelijk Onderzoek TNO, s-Gravenhage (NL)

(72) Inventors: Ray van Brandenburg, Rotterdam (NL); Konstantinos Trichias, Athens (GR); Lucia D'Acunto, Delft (NL); Bastiaan Wissingh, Leiden (NL)

(73) Assignees: Koninklijke KPN N.V., Rotterdam (NL); Nederlandse Organisatie voor Toegepast- Natuurwetenschappelijk Onderzoek TNO, s-Gravenhage (NL)

( * ) Notice: Subject to any disclaimer, the term of this patent is extended or adjusted under 35 U.S.C. 154(b) by 0 days.

(21) Appl. No.: 16/314,184

(22) PCT Filed: Jul. 4, 2017

(86) PCT No.: PCT/EP2017/066563
§ 371 (c)(1),
(2) Date: Dec. 28, 2018

(87) PCT Pub. No.: WO2018/007349
PCT Pub. Date: Jan. 11, 2018

(65) Prior Publication Data
US 2019/0158395 A1 May 23, 2019

(30) Foreign Application Priority Data

Jul. 5, 2016 (EP) .................................. 16177875

(51) Int. Cl.
*H04L 12/721* (2013.01)
*H04L 29/12* (2006.01)
(Continued)

(52) U.S. Cl.
CPC ............ *H04L 45/566* (2013.01); *H04L 45/74* (2013.01); *H04L 61/1582* (2013.01);
(Continued)

(58) Field of Classification Search
CPC .............................. H04L 45/566; H04L 45/74
See application file for complete search history.

(56) References Cited

U.S. PATENT DOCUMENTS

2010/0150328 A1\* 6/2010 Perreault ............. H04L 61/2007
379/142.04
2014/0181140 A1 6/2014 Kim et al.
(Continued)

OTHER PUBLICATIONS

Wang, Lucas et al., "Data Naming in Vehicle-to-Vehicle Communications", IEEE INFOCOM 2012 Workshop on Emerging Design Choices in Name-Oriented Networking, Mar. 2012, pp. 328-333.
(Continued)

*Primary Examiner* — Zhensheng Zhang
(74) *Attorney, Agent, or Firm* — McDonnell Boehnen Hulbert & Berghoff LLP (57) ABSTRACT

The invention relates to a system for receiving an interest message. The system comprises at least one communication interface, at least one memory and at least one processor. The at least one processor is configured to receive an interest message on a first one of the at least one communication interface. The interest message comprises a name of a requested data object. At least one name component of the name of the requested data object comprises a range. The at least one processor is further configured to determine whether the at least one memory comprises a named data object having a name matching the name of the requested data object and to provide the named data object on the first one of the at least one communication interface if the memory comprises the named data object. The at least one processor is also configured to, if the memory does not
(Continued)

comprise the named data object, forward the interest message on one or more further ones of the at least one communication interface, associate the name of the requested data object with an identifier of the first one of the at least one communication interface in the at least one memory, receive the named data object on the one or more further ones of the at least one communication interface and forward the named data object on the first one of the at least one communication interface based on the association.

9 Claims, 6 Drawing Sheets (51) Int. Cl.
  *H04L 12/741* (2013.01)
  *H04L 12/701* (2013.01)
(52) U.S. Cl.
  CPC .......... *H04L 61/303* (2013.01); *H04L 61/306* (2013.01); *H04L 45/00* (2013.01)

(56) References Cited

U.S. PATENT DOCUMENTS

| | | | | |
|---|---|---|---|---|
| 2015/0312373 | A1* | 10/2015 | Muramoto | H04L 47/283 370/238 |
| 2015/0381557 | A1* | 12/2015 | Fan | H04L 61/10 709/245 |
| 2016/0019275 | A1* | 1/2016 | Mosko | H04L 65/4084 707/610 |

OTHER PUBLICATIONS

Zhang, Lixia et al., "Named Data Networking", ACM SIGCOMM Computer Communication Review, vol. 44, No. 3, Jul. 2014, pp. 66-73.

PCT International Search Report and Written Opinion, PCT International Application No. PCT/EP2017/066563, dated Oct. 16, 2017, 15 pages.

European Search Report, European Patent Application No. 16177875.8, dated Jan. 20, 2017, 8 pages.

* cited by examiner

| | Interest | Incoming (interface) | Outgoing (interface) | |
|---|---|---|---|---|
| PIT: | /sensor/temperature/latitude/{[40.5:45.5]} | Face = 3 | Face = 2 | 31 |

| | Prefix | NextHops (interfaces) | |
|---|---|---|---|
| FIB: | /sensor/temperature/ | Face = 2, Cost = 0 | |
| | /kpn/nl | Face = 2, Cost = 0 | 33 |
| | / | Face = 1, Cost = 1 | |

| | Cached data object name | |
|---|---|---|
| Cache: | /sensor/temperature/latitude/47 | 35 |

SYSTEMS AND METHODS FOR TRANSMITTING AND RECEIVING INTEREST MESSAGES

CROSS REFERENCE TO RELATED APPLICATIONS

The present application is a national stage entry of, and claims priority to, PCT/EP2017/066563, filed on Jul. 4, 2017, which claims priority to European Patent Application EP 16177875.8, filed in the European Patent Office on Jul. 5, 2016, both of which are hereby incorporated in their entirety herein by reference.

FIELD OF THE INVENTION

The invention relates to a system for receiving an interest message and to a device for transmitting an interest message.

The invention further relates to a method of receiving an interest message and to a method of transmitting an interest message.

The invention also relates to a computer program product enabling a computer system to perform such methods.

BACKGROUND OF THE INVENTION

Information-Centric Networking (ICN) is a new networking paradigm with the goal of evolving the current Internet infrastructure away from a host-oriented system towards a data-oriented system. Instead of addressing endpoints via IP addresses, in ICN data itself is addressed. By dividing data into chunks, and giving each of those chunks a unique and hierarchical name, ICN allows clients to ask the network for a given named data object, without having to worry where that data is located/stored. One of the benefits of naming data is that it allows intermediate network nodes, such as switches and routers, to opportunistically cache data as it passes by. This in turn allows for content to be transported more efficiently over the internet and for more effective use of the network resources.

Current ICN architectures have two elementary types of messages at their core: interest messages and data messages. When an application wants to retrieve a particular data object, it sends out an interest message for that data object. The most important part of this interest message is the name of the object, or, in cases where the full name of the object is not known, a prefix.

An example of such an ICN architecture is Named Data Networking (NDN) described in "Named data networking", Zhang et al., ACM SIGCOMM Computer Communication Review 44 Issue 3, July 2014, pages 66-73. When a network node receives an interest message, it first checks whether its local cache happens to contain a named data object that matches the name in the interest message. If a corresponding named data object is found, it is wrapped in a data message and sent back over the interface over which the interest message was received.

In the case where the object is not cached, the next step is to check whether the requested name is already in the so-called Pending Interest Table (PIT). The PIT maintains a list of existing, pending data object requests and the corresponding interfaces by which they were requested. When a data message comes in, it is forwarded to all interfaces that according to the PIT have an unsatisfied interest for the corresponding name. The entry in the PIT may then be deleted. When a name in an incoming interest message is not listed in the PIT, it is added along with the interface over which it was received. The interest message is then forwarded on one or more outgoing interfaces according to the Forwarding Information Base (FIB) and the management/strategy layer, in search of the requested data at another node.

US 2014/0181140 discloses a terminal device in a network system that generates and transmits a block query requesting a plurality of segments that make up content and receives segments corresponding to the block query. The block query may include a block range of the content and a content name. A drawback of this terminal device is that the block range can only identify video segments that make up the content instead of any type of data object and that all segments in the range need to be received in order to satisfy the request. Another drawback of this terminal device is that the block range may be used only at the end of the name instead of anywhere in the name.

"Data Naming in Vehicle-to-Vehicle Communications", Wang et al., IEEE INFOCOM Computer Communications Workshop, Orlando Fla., USA, March 2012 enhances the NDN architecture by making it possible to use a maximum and minimum value as a single name component to identify a certain range of interest for the requested data. A drawback of this enhanced architecture is that the concept of ranges is only implemented at the end points of a transaction and only in an application-specific manner. Only the end points that implement the specific application logic will be able to understand the ranges. Intermediate ICN nodes will not be able to understand the proposed naming scheme. A consequence of this is that the intermediate ICN nodes will therefore treat that ranged name as a "normal" name and will not be able to match a data message returning a data object with a name which is in that range with the ranged name requested by the sender. In order for a data message to be matched with the interest requesting the ranged name, the data message needs to bear the same range in its name.

A drawback of both the architecture described in "Data Naming in Vehicle-to-Vehicle Communications" and the terminal device disclosed in US 2014/0181140 is that they are vulnerable to abuse in denial-of-service attacks. Since multiple data objects are returned in response to a single interest message (and also multiple data messages in the case of the terminal device of US 2014/0181140), transmitting a large number of interest messages with a broad range may overload the network.

SUMMARY OF THE INVENTION

It is a first object of the invention to provide a system for receiving an interest message, which allows an interest message in an information-centric network to identify a range while reducing vulnerability to denial-of-service attacks.

It is a second object of the invention to provide a method of receiving an interest message, which allows an interest message in an information-centric network to identify a range while reducing vulnerability to denial-of-service attacks.

It is a third object of the invention to provide a device for transmitting an interest message, which allows an interest message in an information-centric network to identify a range while reducing vulnerability to denial-of-service attacks.

It is a fourth object of the invention to provide a method of transmitting an interest message, which allows an interest message in an information-centric network to identify a range while reducing vulnerability to denial-of-service attacks.

According to the invention, the first object is realized in that the system for receiving an interest message comprises at least one communication interface, at least one memory, and at least one processor configured to receive an interest message on a first one of said at least one communication interface, said interest message comprising a name of a requested data object, at least one name component of said name of said requested data object comprising a range, to determine whether said at least one memory comprises a named data object having a name matching said name of said requested data object, to provide said named data object on said first one of said at least one communication interface if said at least one memory comprises said named data object, to forward said interest message on one or more further ones of said at least one communication interface if said at least one memory does not comprise said named data object, to associate said name of said requested data object with an identifier of said first one of said at least one communication interface in said at least one memory if said at least one memory does not comprise said named data object, to receive said named data object on said one or more further ones of said at least one communication interface if said at least one memory does not comprise said named data object, and to forward said named data object on said first one of said at least one communication interface based on said association if said at least one memory does not comprise said named data object. This system may be used at an intermediate ICN node, for example. Said name of said named data object matching said name of said requested data object does not require that said names match exactly. For example, the names may match if the name components of the named data object that correspond to name components of the requested data object which comprise a range item fall within the specified range(s) and the name components of the named data object that correspond to name components of the requested data object which do not comprise a range exactly match.

The inventors have recognized that it is beneficial to allow use of one or more ranges in names of requested data objects, but that at most one data object with a name matching the interest name, i.e. the name of the requested data object, should be returned in response to a single interest message in order to reduce vulnerability to denial-of-service attacks, e.g. to prevent that someone, in order to overload a system, is able to generate interest messages that result in large amounts of data objects being returned. As an additional advantage over the architecture described in "Data Naming in Vehicle-to-Vehicle Communications", intermediate ICN nodes are able to determine the exact name of a data object when the data object is received in response to an interest message comprising a range in the interest name. This allows the data object to be cached under its exact name and to be retrieved when this exact name matches a received interest name, even when this received interest name is not equal to the interest name of the request that resulted in the data object being cached.

A range may be "1-9", for example. A range may include only integer values, both integer and floating point values, only hexadecimal values or all alphanumeric characters, for example. The range may comprise a wildcard. A wildcard is a character that may be substituted for any of a defined subset of all possible characters. For example, "a?" may be considered to be equal to "aa-az". A wildcard is used in conjunction with at least one non-wildcard character in a name component.

At least a first name component of said name of said requested data object may comprise a first range and at least a second name component of said name of said requested data object may comprise a second range. Use of multiple ranges may be beneficial, as explained in the next paragraphs. The name of the requested data object may comprise more ranges than only these two ranges.

Said first range and said second range may specify values of different attributes. For example, a latitude of interest may be specified to be between 40.5° N and 42.5° N and a longitude of interest may be specified to be between 36° E and 39.5° E.

Said first range and said second range may specify values of the same attribute. For example, a latitude of interest may be specified to be either between 40.5° N and 42.5° N or between 43.5° N and 45.5° N (also referred to as "sub-sets"). As another example, a latitude of interest may be specified to be between 40.5° N and 45.5° N, except between 42.5° N and 43.5° N (the latter is also referred to as an "exclusion range").

Said name of said requested data object may represent a plurality of possible values measured by a sensor. For example, an interest message may be created and transmitted in order to obtain temperature data from a temperature sensor that is located in a certain geographical area.

Said name of said requested data object may represent a plurality of alternative content qualities. For example, a quality with a value of 1 may correspond to a lowest quality and a quality with a value of 9 may correspond to a highest quality. An interest message may specify a quality between 3 and 9 in order to obtain a data object with a certain minimum quality.

Said name component comprising said range may be followed in said name of said requested data object by at least one further name component and said at least one processor may be further configured to select a subset from a plurality of communication interfaces to forward said interest message on in dependence on at least said at least one further name component. The subset may be selected according to the Forwarding Information Base (FIB) and the management/strategy layer in an ICN network.

By not limiting the use of a range to only the end of an interest name, ranges can be used more flexibly. Since the system recognizes a range, it can use more than only the name components before the range for selecting the subset of communication interfaces to forward the interest message on. The system may be able to select the subset not only in dependence on the at least one further name component (and any name components before the range if applicable), but also in dependence on the range itself. For example, a first outgoing interface may be used to forward interest messages with a latitude higher than 42° N and a second outgoing interface may be used to forward interest messages with a latitude equal or lower than 42° N. Preferably, a range may be used anywhere in the interest name.

Said at least one processor may be configured to store an entry comprising said association of said name of said requested data object with said identifier of said first one of said at least one communication interface in said at least one memory, to receive a new data object on said one or more further ones said at least one communication interface, to forward said new data object on a communication interface associated with an active entry stored in said at least one memory if a name of said new data object matches a requested data object name associated with said active entry, and to remove said active entry from said at least one memory or deactivate said active entry in said at least one memory if said new data object is forwarded on said communication interface associated with said active entry.

This is a beneficial implementation of the system of the invention. Favorably, if an interest message comprises an interest name for which an entry is already stored in the at least one memory, the communication interface on which the interest message is received is associated with the interest name already stored in the memory. When a data object having a name matching the interest name is received, the data object may be forwarded on all communication interfaces associated with the interest name. Removing or deactivating the active entry allows the device to ignore subsequently received named data objects that would have matched the interest message but do not need to be provided to and processed by an application, because a first matching data object was already received and provided to the application.

According to the invention, the second object is realized in that the method of receiving an interest message comprises the steps receiving an interest message on a first one of at least one communication interface, said interest message comprising a name of a requested data object, at least one name component of said name of said requested data object comprising a range, determining whether at least one memory comprises a named data object having a name matching said name of said requested data object, providing said named data object on said first one of said at least one communication interface if said at least one memory comprises said named data object, forwarding said interest message on one or more further ones of said at least one communication interface if said at least one memory does not comprise said named data object, associating said name of said requested data object with an identifier of said first one of said at least one communication interface in said at least one memory if said at least one memory does not comprise said named data object, receiving said named data object on said one or more further ones of said least one communication interface if said at least one memory does not comprise said named data object, and forwarding said named data object on said first one of said at least one communication interface based on said association if said at least one memory does not comprise said named data object. Said method may be performed by software running on a programmable device. This software may be provided as a computer program product.

Said step of associating said name of said requested data object with an identifier of said first one of said at least one communication interface in said at least one memory may comprise storing an entry comprising said association in said at least one memory. Said step of receiving said named data object on said one or more further ones of said at least one communication interface if said at least one memory does not comprise said named data object may comprise receiving a new data object on said one or more further ones of said at least one communication interface. Said step of forwarding said named data object on said first one of said at least one communication interface based on said association if said at least one memory does not comprise said named data object may comprise forwarding said new data object on a communication interface associated with an active entry stored in said at least one memory if a name of said new data object matches a requested data object name associated with said active entry. Said method may further comprise the step of removing said active entry from said at least one memory or deactivate said active entry in said at least one memory if said new data object is forwarded on said communication interface associated with said active entry.

According to the invention, the third object is realized in that the device for transmitting an interest message comprises at least one communication interface and at least one processor configured to request a single named data object by transmitting an interest message on said at least one communication interface to a system for receiving an interest message, said interest message comprising a name of a requested data object, at least one name component of said name of said requested data object comprising a range.

Said device for transmitting an interest message may further comprise at least one memory, wherein said at least one processor is configured to store an entry corresponding to said interest message in said at least one memory, to receive a named data object from said system for receiving said interest message, and to remove said entry from said at least one memory or deactivate said entry in said at least one memory if a name of said named data object matches said name of said requested data object. Removing or deactivating the active entry allows the device to ignore subsequently received named data objects that would have matched the interest message but do not need to be provided to and processed by an application, because a first matching data object was already received and provided to the application.

According to the invention, the fourth object is realized in that the method of transmitting an interest message comprises the step of requesting a single named data object by transmitting an interest message to a system for receiving an interest message, said interest message comprising a name of a requested data object, at least one name component of said name of said requested data object comprising a range.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least a first software code portion, the first software code portion, when executed or processed by a computer, being configured to perform executable operations comprising receiving an interest message on a first one of at least one communication interface, said interest message comprising a name of a requested data object, at least one name component of said name of said requested data object comprising a range, determining whether at least one memory comprises a named data object having a name matching said name of said requested data object, providing said named data object on said first one of said at least one communication interface if said at least one memory comprises said named data object, forwarding said interest message on one or more further ones of said at least one communication interface if said at least one memory does not comprise said named data object, associating said name of said requested data object with an identifier of said first one of said at least one communication interface in said at least one memory if said at least one memory does not comprise said named data object, receiving said named data object on said at one or more further ones of said least one communication interface if said at least one memory does not comprise said named data object, and forwarding said named data object on said first one of said at least one communication interface based on said association if said at least one memory does not comprise said named data object.

A non-transitory computer-readable storage medium stores at least a second software code portion, the second software code portion, when executed or processed by a computer, being configured to perform executable operations comprising: requesting a single named data object by transmitting an interest message to a system for receiving an interest message, said interest message comprising a name of a requested data object, at least one name component of said name of said requested data object comprising a range.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
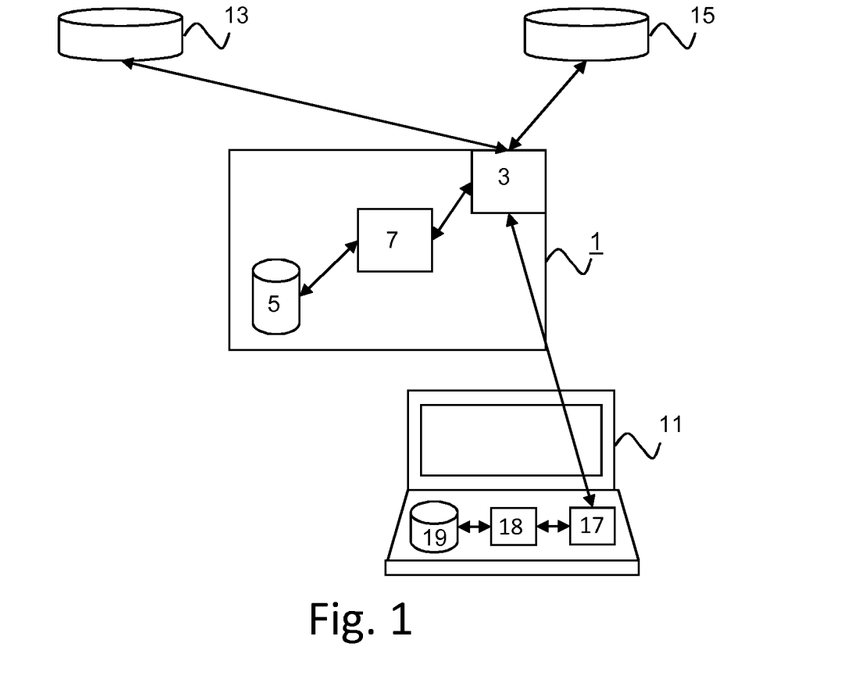
FIG. 1 is a block diagram of embodiments of the system and the device of the invention.

An embodiment of the system for receiving an interest message is shown in FIG. 1. The system 1 comprises a set of communication interfaces 3, a memory 5 and a processor 7. The processor 7 is configured to receive an interest message on a first one of the set of communication interfaces 3, e.g. from an interested device 11. The interest message comprises a name of a requested data object. At least one name component of the name of the requested data object comprising a range. The processor 7 is further configured to determine whether the memory 5 comprises a named data object having a name matching the name of the requested data object. The processor 7 is further configured to provide the named data object on the first one of the set of communication interfaces 3 if the memory 5 comprises the named data object, e.g. to the interested device 11.

The processor 7 is further configured to forward the interest message on one or more further ones of the set of communication interfaces 3, e.g. to one or more further devices 13 and 15, if the memory 5 does not comprise the named data object. The processor 7 is further configured to associate the name of the requested data object with an identifier of the first one of the set of communication interfaces 3 in the memory 5 if the memory 5 does not comprise the named data object. The processor 7 is further configured to receive the named data object on the one or more further ones of the set of communication interfaces 3, e.g. from the one or more further devices 13 and 15, if the memory 5 does not comprise the named data object. The processor 7 is further configured to forward the named data object on the first one of the set of communication interfaces 3, e.g. to the interested device 11, based on the association if the memory 5 does not comprise the named data object.

The system 1 may be a dedicated network router, for example, but may also, for example, be a user device (with or without a user interface), e.g. a mobile phone or a device embedded in a vehicle. The processor 7 may comprise one or more general-purpose processing units and/or one or more application specific processing units. The processor 7 may comprise an ARM processor, for example. The memory 5 may comprise one or more magnetic hard disks, one or more optical drives, and/or one or more solid state memories, for example. The named data object(s) may be stored in the same memory or in a different memory than other information like a Pending Interest Table (PIT), Forwarding Information Base (FIB) or a network node configuration. A collection of stored named data objects may be referred to as a cache or Content Store (CS). The set of communication interfaces 3 may comprise one or more optical ports, one or more wireless transceivers and/or one or more Ethernet ports, for example. The set of communication interfaces 3 may comprise one or more internal interfaces. For example, if the system 1 is running both a client and a server, the client and the server may use an internal communication interface to exchange interest messages and data messages. An internal communication interface may comprise a Unix domain socket and/or an inter-process communication socket, for example.

FIG. 1 also shows an embodiment of the device for transmitting an interest message. The device 11 comprises a communication interface 17 and a processor 18. The processor 18 is configured to request a single named data object by transmitting an interest message on the communication interface 17 to system 1. The interest message comprises a name of a requested data object. At least one name component of the name of the requested data object comprises a range.

The device 11 may be, for example, a user device and may comprise, for example, a user interface, e.g. a touch screen. The device 11 may be a laptop, tablet, mobile phone or a device embedded in a vehicle, for example. The processor 18 may be an ARM or Qualcomm processor, for example. The device 11 may further comprise other components typical for a user device, e.g. a memory and a power supply. The communication interface 17 may comprise a wireless data (e.g. cellular and/or WiFi) transceiver for example.

In the embodiment of the device shown in FIG. 1, the device 11 further comprises a memory 19. The processor 18 may be configured to store an entry corresponding to the interest message in the memory 19. The processor 18 may further be configured to receive a named data object from the system 1. The processor 18 may further be configured to remove the entry from the memory 19 or deactivate the entry in the memory 19 if a name of the named data object matches the name of the requested data object. The memory 19 may comprise one or more magnetic hard disks, one or more optical drives, and/or one or more solid state memories, for example. Deactivating the entry in the memory 19 may comprise setting a field of the entry titled "active" to "no", setting a field of the entry titled "satisfied" to "yes" or setting a field of the entry titled "deactivated" to "yes", for example.

Figure 2:
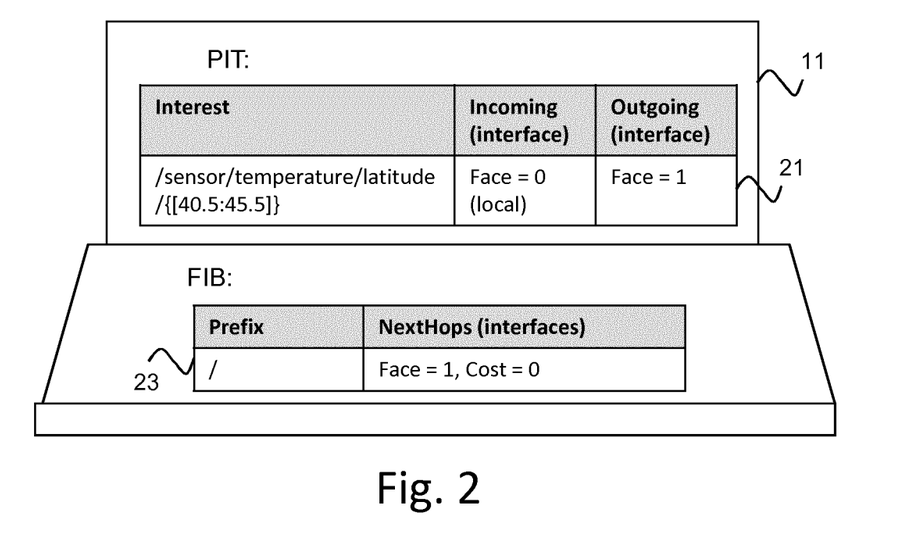
FIG. 2 shows an example of a PIT and a FIB used by an embodiment of the device of the invention.

The entry stored in the memory 19 or 5 may be stored in a Pending Interest Table (PIT) 21 in memory 19 or 5. An example of such a PIT 21 is shown in FIG. 2. In this example, the device 11 wants to receive a single named data object having a name matching the named data object "/sensor/temperature/latitude/{[40.5:45.5]}", which means that the device 11 wants to receive a data object that contains temperature measurements from a sensor with a geographical latitude larger than 40.5 degrees and smaller than 45.5 degrees. In this embodiment, the device 11 does not receive interest messages from other devices and the interest is therefore registered as being local (e.g. interface 0).

A Forwarding Information Base (FIB) may be used to determine which further device(s) to transmit an interest message to. A FIB has a similar purpose in Named Data Networking as in Open Shortest Path First (OSPF) routing, but for names instead of IP addresses. In this embodiment, device 11 is only connected to system 1 and all interests are transmitted on interface 1, to which system 1 is connected, see FIB 23 in FIG. 2.

In the embodiment of the system shown in FIG. 1, the processor 7 is configured to store an entry comprising the association of the name of the requested data object with the identifier of the first one of the set of communication interfaces 3 in the memory 5, to receive a new data object on the one or more further ones of the set of communication interfaces 3, e.g. from the one or more further devices 13 and 15, to forward the new data object on a communication interface associated with an active entry stored in the memory 5, e.g. to a device 11, if a name of the new data object matches a requested data object name associated with the active entry, and to remove the active entry from the memory 5 or deactivate the active entry in the memory 5 if the new data object is forwarded on the communication interface associated with the active entry, e.g. to device 11. Deactivating an entry in the memory 5 may comprise setting a field of the entry titled "active" to "no", setting a field of the entry titled "satisfied" to "yes" or setting a field of the entry titled "deactivated" to "yes", for example.

Figure 3:
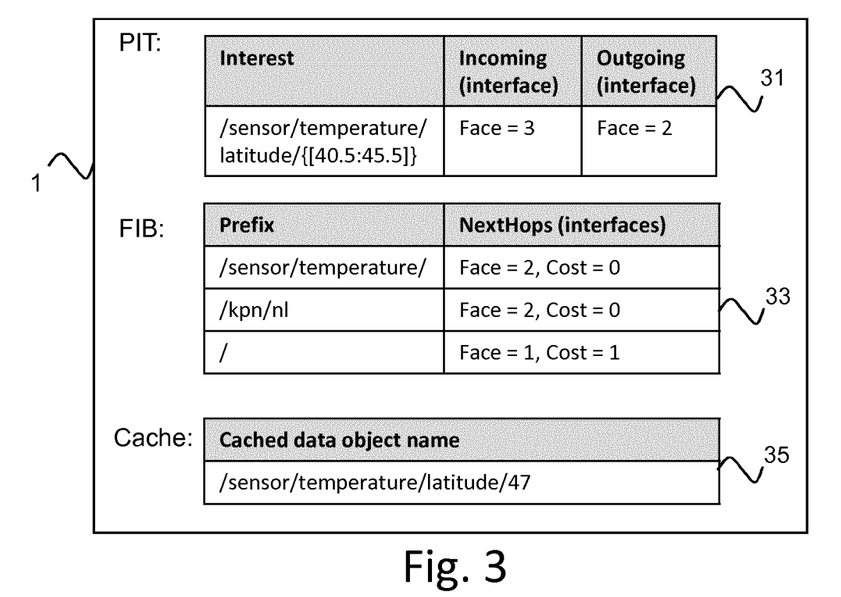
FIG. 3 shows an example of a PIT, a FIB and a cache index used by an embodiment of the system of the invention.

The entry stored in the memory 5 may be stored in a Pending Interest Table (PIT) 31 in memory 5. An example of such a PIT 31 is shown in FIG. 3. An interest message comprising the interest name "/sensor/temperature/latitude/{[40.5:45.5]}" is received from device 11 and stored in PIT 31. In this example, the device 11 is connected to interface 3 of system 1. In the example shown in FIG. 3, a data object with name "/sensor/temperature/latitude/47" is stored in the cache of system 1. Since this data object is not a match for the received interest message, this data object is not returned to the device 11. Instead, an entry is made in the PIT 31 and the interest message is forwarded to a further device on interface 1 or 2.

As described in relation to FIG. 2, a Forwarding Information Base (FIB) may be used to determine on which interface to forward the interest message. Whether an interest message is forwarded on a single interface (e.g. the one with the longest prefix match) or on multiple interfaces (e.g. all matches) is a choice that may be specified in a management/strategy layer. In this example, device 11 is further connected to a local network on interface 2 and to an Internet gateway on interface 1. All interests with a name prefix "/sensor/temperature/" or a name prefix "/kpn/n1/" are forwarded on interface 2. All other interests are forwarded on interface 1, which is the default interface. In this example, the interest message comprising the interest name "/sensor/temperature/latitude/{[40.5:45.5]}" has a prefix "/sensor/temperature/" and is forwarded on interface 2.

Figure 4:
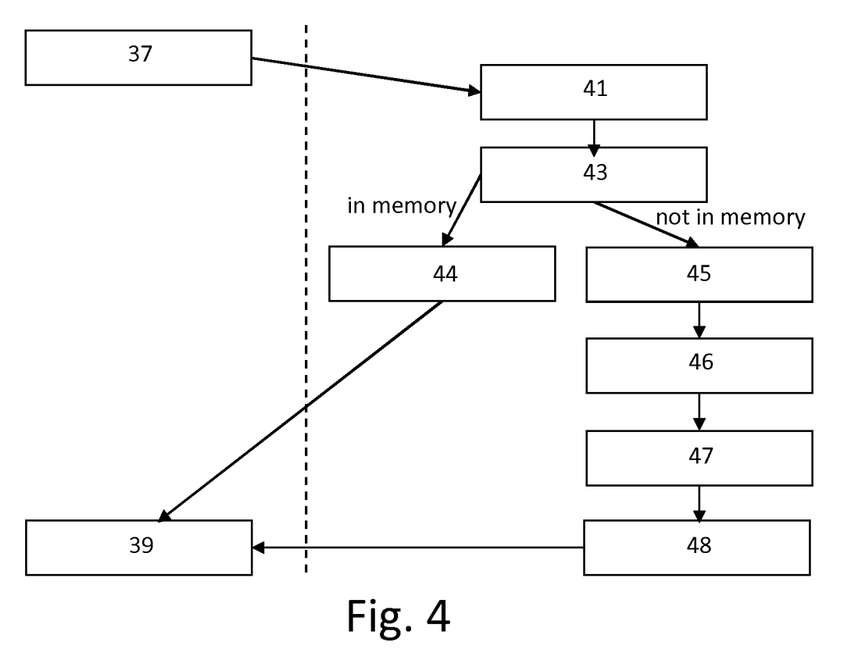
FIG. 4 is a flow diagram of a first embodiment of the methods of the invention.

A first embodiment of the methods of transmitting and receiving an interest message are shown in FIG. 4. A step 37 comprises requesting a single named data object by transmitting an interest message to a system suitable for receiving an interest message or configured to receive an interest message, e.g. the system 1 of FIG. 1. The interest message comprises a name of a requested data object. At least one name component of the name of the requested data object comprises a range. A step 41 comprises receiving an interest message on a first one of at least one communication interface. A step 43 comprises determining whether at least one memory comprises a named data object having a name matching the name of the requested data object. A step 44 comprises providing the named data object on the first one of the at least one communication interface if the at least one memory comprises the named data object. If, on the other hand, the at least one memory does not comprise the named data object, steps 45, 46, 47 and 48 are performed.

Step 45 comprises forwarding the interest message on one or more further ones of the at least one communication interface. Step 46 comprises associating the name of the requested data object with an identifier of the first one of the at least one communication interface in the at least one memory. Steps 45 and 46 may be performed in sequence in any desired order or in parallel. Step 47 comprises receiving the named data object on the one or more further ones of the least one communication interface. Step 48 comprises forwarding the named data object on the first one of the at least one communication interface based on the association if the at least one memory does not comprise the named data object. A step 39 comprises receiving the data objected transmitted in step 44 or step 48. A message may be modified before it is forwarded. For example, the forwarded data message may have a different header than the received data message.

In an embodiment (not shown in FIG. 4), the association (e.g. a PIT entry) is removed if the named data object is not received within a certain period (timeout). This may be handled in the same way for name components that include a range as for name components that do not include a range.

The name of the requested data object may comprise a first range and a second range. The first range and the second range may specify values of different attributes or values of the same attribute. The name of the requested data object may comprise further ranges, e.g. a third range, a fourth range, etc. The range may be followed in the name by at least one further name component and step 45 may comprise selecting a subset from a plurality of communication interfaces to forward the interest message on in dependence on at least the at least one further name component (and optionally on other name components). The at least one further name component may comprise a further range, for example. An example of a name in which the approximation of the name is followed by at least one further name component is "/sensor/temperature/height/{[200:400]}/celsius", which means that a device is interested in a data object that contains temperature measurements in Celsius from a sensor on a height between 200 and 400 meters.

The name of the requested data object may represent a plurality of possible values measured by a sensor, for example. This may be useful when the requesting device does not know an exact location of the sensor. The name of the requested data object may represent a plurality of alternative content qualities, for example.

Figure 5:
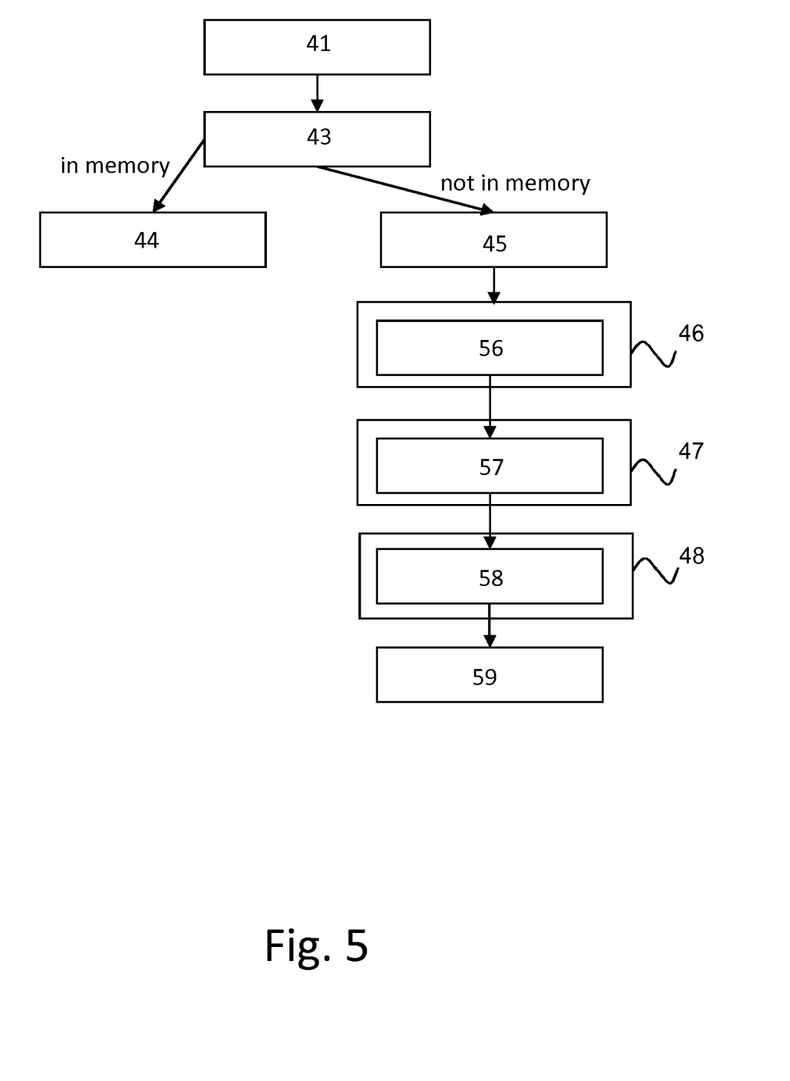
FIG. 5 is a flow diagram of a second embodiment of the method of receiving an interest message.

A second embodiment of the method of transmitting an interest message is shown in FIG. 5. In step 41, an interest message is received on a first one of at least one communication interface. In step 43, it is determined whether the at least one memory comprises a named data object having a name matching the name of the requested data object. In step 44, the named data object is provided on the first one of the at least one communication interface if the at least one memory comprises the named data object. If the at least one memory does not comprise the named data object, steps 45, 56, 57, 58 and 59 are performed. In step 45, the interest message is forwarded on one or more further ones of the at least one communication interface. In an embodiment of step 46, a step 56 comprises storing an entry in the at least one memory, e.g. in the PIT. The entry comprises an association between the name of the requested data object and an identifier of the first one of the at least one communication interface.

In an embodiment of step 47, a step 57 comprises receiving a new data object on the one or more further ones of the at least one communication interface. In an embodiment of step 48, a step 58 comprises forwarding the new data object on a communication interface associated with an active entry stored in the at least one memory if a name of the new data object matches a requested data object name associated with the active entry. A step 59 comprises removing the active entry from the at least one memory or deactivate the active entry in the at least one memory if the new data object is forwarded on the communication interface associated with the active entry. Removing or deactivating the active entry allows the device to ignore subsequently received named data objects that would have matched the interest message but do not need to be provided to and processed by an application, because a first matching data object was already received and provided to the application. The active entry may also be removed if no data object with a name matching the requested data object name is received within a certain period (timeout). This step is not shown in FIG. 5 and may be performed both for name components that include a range and for name components that do not include a range.

Preferably, the basic ICN protocol is extended and a special type of name component, the so-called Name Range Component (NRC), is introduced. This NRC includes corresponding syntax, which may comprise a tuple structure in combination with some special (reserved) characters, that is used in interest messages. The corresponding data messages that serve as replies to these ranged name interests, are normal, contemporary ICN data packets whose contained data belong within the requested range and thus satisfy the interest.

The Name Range Component can be used to express an interest that can be satisfied by a range of named data objects. As an example, for a video streaming application, a certain name component may represent segment quality and this certain name component may be specified as being '1' or higher (e.g. "[≥1]") or between certain values such as 1 and 9 (e.g. "[1 ... 9]"), for example. If a video segment with a higher quality than '1' is encountered first, this video segment is returned, thereby increasing the video quality for the user while making more efficient use of the network.

Alternatively, for a geographically-named sensor application, a user or application might be interested in temperature information originating around a specific geographical point in terms of latitude and longitude (e.g. [40.5, 36.9]) but with a certain tolerance in accuracy of the geo-location, e.g. 1.2 degrees for latitude and 0.8 degrees for longitude. In this case any data object containing temperature information from a point with latitude [40.5+/−1.2] and longitude [36.9+/−0.8] would satisfy such an interest and could be returned as the appropriate response.

All of the above examples and more, can be satisfied with the use of single interest messages, instead of sending out multiple interest messages for every possible combination. This single interest message may use a Name Range Component with the following format:

/Prefix1/Prefix2/{Range1$_{min}$:Range1$_{max}$:SpecialActions}/
   Prefix4/{Range2$_{min}$:Range2$_{max}$:SpecialActions}

The Name Range Component allows an ICN node more freedom in expressing an interest for a range of named data objects for multiple prefixes at the same time. Moreover, since it specifies a new syntax and name component, which can be understood by intermediate ICN nodes, it doesn't suffer from the same problems as an application-level naming scheme containing a regular name component that the application interprets as a range. The exact meaning of the above format, including "SpecialActions", is explained in detail below.

In addition to changing the way a name is encoded in ICN, allowing name ranges has consequences for forwarding strategies and the way the PIT, cache (sometimes referred to as Content Store (CS)) and FIB are implemented as well. As an example, the FIB can contain conflicting entries depending on which value in the range is chosen.

In order for ICN nodes to recognize a Name Range Component as a special name component that might influence the way in which an interest message is processed, a Name Range Component is distinguished from a regular name component. This may be achieved by defining new types of interest messages carrying a Name Range Component, or using special (reserved) characters for expressing a Name Range Component or any other method used in ICN architectures to identify new names.

Within the context of the NDN (Named-Data Networking) and CCN (Content-Centric Networking) architectures (e.g. PARC's implementation of CCN called CCNx), which use TLV (Type-Length-Value) encoding to encode interest and data messages, a special type might be assigned to Name Range Components as both NDN and CCN preserve unassigned ranges of TLV types to be used for future assignments.

For example, a generic name component in NDN is indicated by a type field that is set to '8', a Name Range Component in NDN might therefore be indicated by a type field that is set to '38' (part of the range currently reserved for experimental use). In CCN, on the other hand, such a generic name segment is indicated by a TLV type of '%x0001', a Ranged Name Segment in CCN might therefore be indicated by a type field within the range of '%x1000'-'%x1FFF' (which is currently reserved for experimental use).

The benefit of choosing a special TLV type is that it allows Name Range Components to be easily identified and that it doesn't limit the characters than can be used in regular name components.

Within such a new Name Range Component, special characters (e.g. ':', '$' or '¥'), may be used to mark a separation among the various entries comprising the aforementioned ranged name data format. Different separation characters may be used to indicate different semantics for the various name components. Multiple embodiments can be envisioned regarding the contents of an NRC. For instance:

The Name Range Component only includes integer values.
   The Name Range Component includes both integer and floating point values.
   The Name Range Component only includes hexadecimal values (e.g. '0x5A4:0xFFF')
   The Name Range Component includes all alphanumeric characters, where the leftmost letter is considered to be most significant and letters are compared on their position in the alphabet (e.g. allowing one to express a range as 'aab:azb' or 'aab:dbd').

In order for the aforementioned solution to always work perfectly, all of the ICN nodes need to have and operate under the same understanding regarding the formatting rules of an NRC name entry and the meaning and functionality of any special (reserved) characters introduced. The use of special characters is not required though and only used in this disclosure for the sake of explaining the used mechanism. All special characters are interchangeable and any other character can serve the same purpose, as long as all the ICN nodes operate with the same syntax.

To create a syntax for the NRC component, five special (reserved) characters may be defined as "SpecialActions", for example. The following definitions may, for example, be used:

{ }=Start and End of the entire range requested
⌈ ⌋=Start and End of range subset
:=Range separator
$=Step symbol. Used to indicate the step with which the search will be executed within the desired range
¥=Exclusion symbol. Used to indicate the exclusion from the search of certain instances or ranges.

According to the above syntax/symbol definition any range can be requested within an interest message by using an NRC with the following format:

/Prefix1/Prefix2/{⌈Rangemin:Rangemax $ Step $¥ExclusionValue¥⌋}

In the above defined format, only one of the minimum and maximum values is compulsory to exist in the NRC (always present) while all other fields are optional. The various possibilities that such a naming scheme offers for range matching are elaborated below with an example.

Simplest Range
NRC=/sensor/temperature/latitude/{⌈40.5:45.5⌋}
Response=The issuing of an interest message with the above NRC will result in the return of any data object (i.e. the first found matching data object) that contains temperature measurements from a sensor with a geographical latitude larger than 40.5 degrees and smaller than 45.5 degrees.

Range with Step
NRC=/sensor/temperature/latitude/{⌈40.5:45.5 $ 0.5 $⌋}
Response=The issuing of an interest message with the above NRC will result in the return of any data object (i.e. the first found matching data object) that contains temperature measurements from a sensor with a geographical latitude larger than 40.5 degrees and smaller than 45.5 degrees but with a step of 0.5 degrees. That means that the only latitudes that will satisfy the above search are [40.5, 41, 41.5, 42, 42.5, 43, 43.5, 44, 44.5, 45, 45.5].

Range with Exclusion (May Comprise a Range or a Single Value)
NRC=/sensor/temperature/latitude/{⌈40.5:45.5 ¥ 42:43 ¥⌋}
Response=The issuing of an interest message with the above NRC will result in the return of any data object (i.e. the first found matching data object) that contains temperature measurements from a sensor with a geographical latitude larger than 40.5 degrees and smaller than 45.5 degrees except from sensors with latitudes between 42 and 43 degrees.

Range with Multiple Sub-Sets
NRC=/sensor/temperature/latitude/{⌈40.5:42.5 $ 0.5 $⌋, ⌈43.5:45.5 ¥ 44 ¥⌋}
Response=The issuing of an interest message with the above NRC will result in the return of any data object (i.e. the first found matching data object) that contains temperature measurements from a sensor with a geographical latitude larger than 40.5 degrees and smaller than 42.5 degrees but with a step of 0.5 degrees, i.e. [40.5, 41, 41.5, 42, 42.5] or from a sensor with latitude larger than 43.5 degrees and smaller than 45.5 degrees except sensors with latitude of 44 degrees.

The number of allowed sub-sets within a single range may be configurable and should preferably be limited by the network administrator, since a large number of subsets could lead to exhaustive, resource-consuming searches.

Range for Multiple Name Components
NRC=/sensor/temperature/latitude/{⌈40.5:42.5 $ 0.5 $⌋}/longitude/{⌈36:39.5 ¥ 37 ¥⌋}
Response=The issuing of an interest message with the above NRC will result in the return of any data object (i.e. the first found matching data object) that contains temperature measurements from a sensor with a geographical latitude larger than 40.5 degrees and smaller than 42.5 degrees but with a step of 0.5 degrees, i.e. [40.5, 41, 41.5, 42, 42.5] and with a geographical longitude larger than 36 degrees and smaller than 39.5 degrees except sensors with a longitude of 37 degrees.

From the examples presented above, it can be seen that by using the NRC within a new TLV type, information can be retrieved from the network in a very flexible manner without requiring the consumer to know the precise name of the data object that contains the required information. Moreover, this scheme can lead to service optimization and increased Quality of Experience (QoE) for the users in certain applications (e.g. video streaming), as it does not force users to a certain quality of service but just defines minimum (or maximum) thresholds and criteria that have to be met, irrespective of the exact quality and location of the content. Finally, in most cases, the present scheme facilitates the data retrieval process and minimizes traffic in the network, since multiple data objects are now potential candidates to be returned as the matching data object to an interest, which means that it is more likely that a proper response object is found closer to the consumer thus reducing the 'hops' between producer and consumer and mitigating the traffic load and the links of the network. This also means that frequently, less interest messages need to be sent in order to find a matching data object. If a requestor is not certain of a name, a single interest message with a range may replace multiple interest messages without a range.

Given that forwarding interest and data messages in ICN is dependent on entries in the PIT and FIB and involves looking up names included in interest messages in the PIT, cache and/or the FIB, a name in an interest message becoming multi-dimensional affects how the PIT, cache and FIB are used. The processes to cope with the introduction of NRC are depicted in FIG. 6 and FIG. 7.

Figure 6:
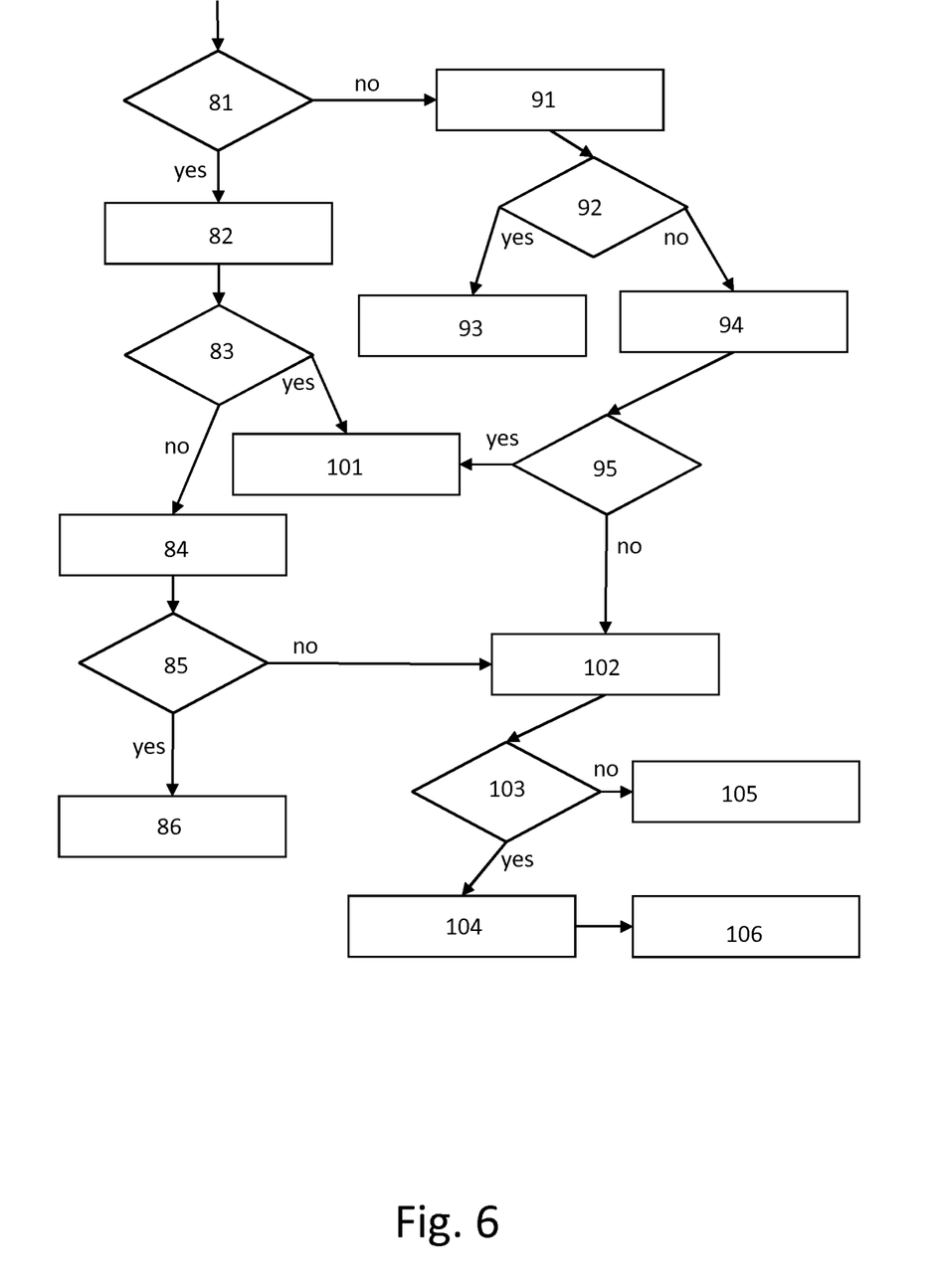
FIG. 6 is a flow diagram showing an embodiment of a process performed following the receipt of an interest message.
Figure 7:
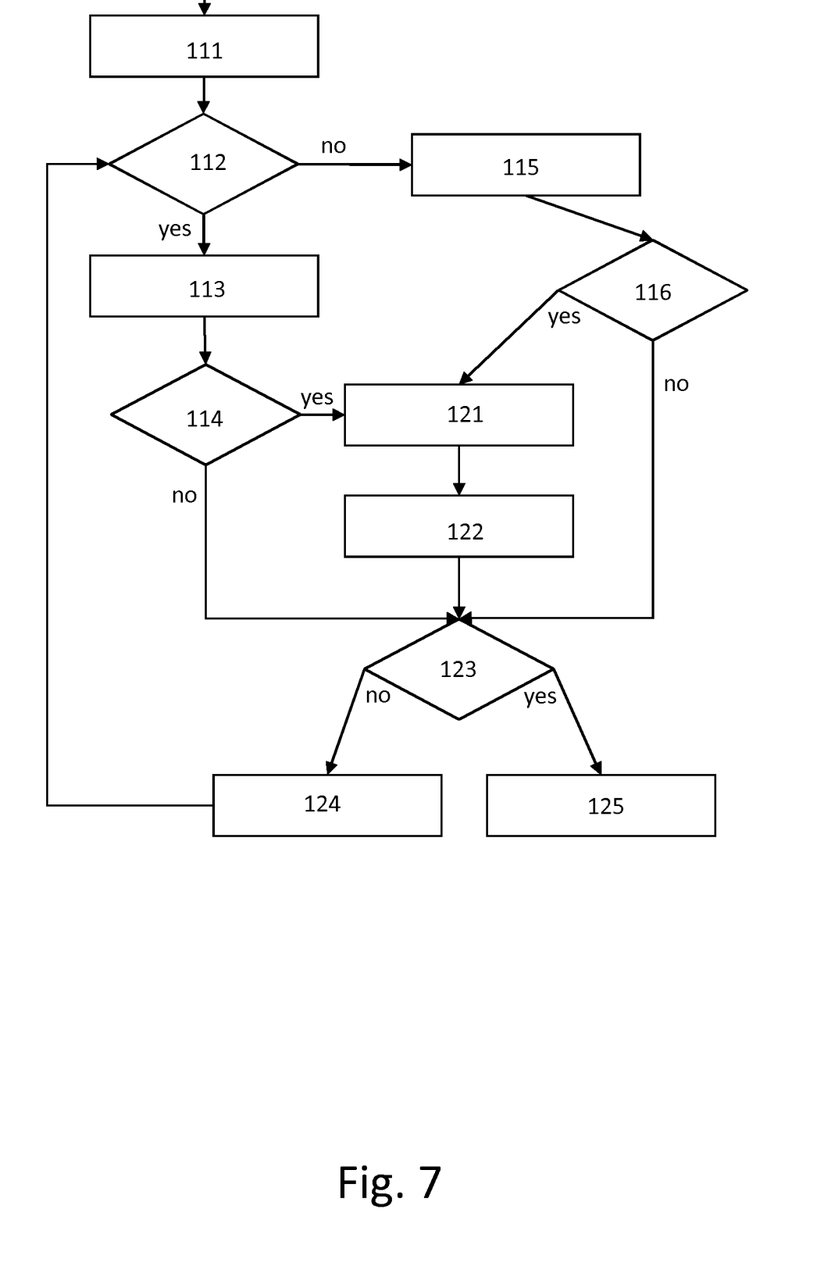
FIG. 7 is a flow diagram showing an embodiment of a process performed following the receipt of a data message.

The entire process that is taking place at the moment of a new interest message arrival at an ICN node with integrated NRC functionality, according to the present disclosure, is depicted in FIG. 6 in the form of a flowchart.

Step 81 comprises checking whether a received interest message comprises a Name Range Component. If not, the interest message is handled the same way as in a conventional ICN router: step 91 comprises searching an item with the same name in the PIT. If such an item is found in step 92, this means that the requested data object is not in the cache and the PIT index is increased in step 93, i.e. the interface on which the interest message is received is associated with the found item. Since the existence of the item in the PIT means that a similar interest message was previously forwarded to a further device, this is not repeated. If an item with the same name in the PIT is not found in step 92, a step 94 is performed. Step 94 comprises finding an item with the same name in the cache. If the item is found in step 95, it is returned in a data message in step 101 on the interface on which the interest message was received. No entry needs to be made in the PIT. If the item is not found in step 95, a step 102 is performed. In an alternative embodiment, the order in which steps 91 and 94 are performed may be reversed.

Step 102 comprises searching the FIB for an interface on which to forward the interest message. If it is determined in step 103 that the FIB does not comprise an entry with a prefix of the interest name, the process stops in step 105. The interest message is not forwarded. If a match is found in step 103, the interest message is forwarded on the corresponding interface in step 104 and an entry for the interest is added in the PIT in step 106. In an alternative embodiment, step 106 is performed between steps 92 and 94.

If it is determined in step 81 that the received interest message comprises a Name Range Component, a step 82 is performed. Step 82 comprises finding the first matching item in the cache. An item in the cache matches an interest comprising one or more Name Range Components if the corresponding one or more name components of the cached item fall within the specified range(s) and any name components of the interest that do not comprise a range exactly match the corresponding name components of the cached item, for example. For example, a cached item with the name "/sensor/temperature/latitude/45" matches the interest with name "/sensor/temperature/latitude/{[40.5:45.5]}". Only one matching item needs to be found, because only a single data object is returned in response to a single interest message. If a matching item is found in step 83, it is returned in a data message in step 101 on the interface on which the interest message was received. In an alternative embodiment, a best match instead of a first match is found in step 82. In this case, the management layer/strategy layer may define what a best match is, for example. For example, the management layer/strategy layer may define that a median value (e.g. 43 in a range [40.5:45.5] is a better match than an edge value (e.g. 40.5 in a range [40.5:45.5]).

If a matching item is not found in step 83, a step 84 is performed. Step 84 comprises finding an item with the same name in the PIT. If an item with the same name is found in the PIT in step 85, the PIT index is increased in step 86, i.e. the interface on which the interest message is received is associated with the found item. Since the existence of the item in the PIT means that a similar interest message was previously forwarded to a further device, this is not repeated. If an item with the same name is not found in the PIT in step 85, step 102 is performed.

Step 102 comprises searching the FIB for an interface on which to forward the interest message. When the interest name comprises a Name Range Component, a first interface might be assigned to a first part of a range and a second interface might be assigned to a second part of the range. In this case, the interest message may be forwarded on both interfaces or on only one of the interfaces. If it is determined in step 103 that the FIB does not comprise an entry with a prefix of the interest name, the process stops in step 105. If a match is found in step 103, the interest message is forwarded on the corresponding interface in step 104 and an entry for the interest is added in the PIT in step 106. In an alternative embodiment, step 106 is performed between steps 85 and 102.

The exact search and forwarding name matching rules that apply to an ICN network and/or isolated ICN nodes may be dynamic and configurable and may be set through the management/strategy layer of the ICN network, or may be application dependent. Apart from the interest response/forwarding process, the data object forwarding and matching procedure also needs to be updated to support NRC operations. More specifically, ICN nodes need to be able to match an ordinary ICN data object to the requested range of an NRC interest, and perform the necessary reverse forwarding operations. This procedure is depicted in FIG. 7, in the form of a flowchart.

After a data message has been received, a first interest is inspected in the PIT in step 111 and a step 112 is performed. Step 112 comprises checking whether there is Name Range Component in the name of this first interest. If not, the interest message is handled the same way as in a conventional ICN router: step 115 comprises checking whether the data object name is the same as the name of the stored interest. If it is determined in step 116 that the names are different, then no action is taken with regard to this interest and step 123 is performed. If it is determined in step 116 that the names are the same, the data object is forwarded over the interface(s) associated with the interest in step 121 and the interest is deleted from the PIT in step 122. Step 123 is performed after step 122.

If it is determined in step 112 that the interest name comprises a Name Range Component, a step 113 is performed. Step 113 comprises checking whether the name of the data object name matches, e.g. is in range of, the name of the interest. For example, a received data object name "/sensor/temperature/latitude/45" matches an interest name "/sensor/temperature/latitude/{[40.5:45.5]}. If no match is found in step 114, then no action is taken with regard to this interest and step 123 is performed. If a match is found in step 114, then the data object is forwarded over the interface(s) associated with the interest in step 121 and the interest is deleted from the PIT in step 122. Step 123 is performed after step 122. In an alternative embodiment, all interests with a name matching the received data object name and their corresponding associated interfaces are determined first before forwarding the received data object on these interfaces.

In step 123, it is checked whether the interest that was just compared with the received data object was the last interest stored in the PIT. If so, the process ends in step 125 and the data object may be cached or deleted depending on the caching strategy. If not, the next interest is inspected in the PIT in step 124 and step 112 is performed again, but this time for the next interest. Step 123 is present, because a single data object name could match multiple different interest names as a result of the use of Name Range Components. If no Name Range Components would be used, step 123 would not be necessary, as all interests with the same interest name (from different interfaces) would be merged into one PIT entry. So at most one interest without NRC and multiple interests with NRC may be found with the procedure of FIG. 7.

The exact matching and forwarding rules may once again be dictated by the management/strategy or application layers. Further steps may be taken to ensure the forwarding of an interest or data object to the most suitable interface. For instance, the matching and forwarding rules may be different for the same interest/data object depending on the amount of times a search was needed in order to find an appropriate match.

Figure 8:
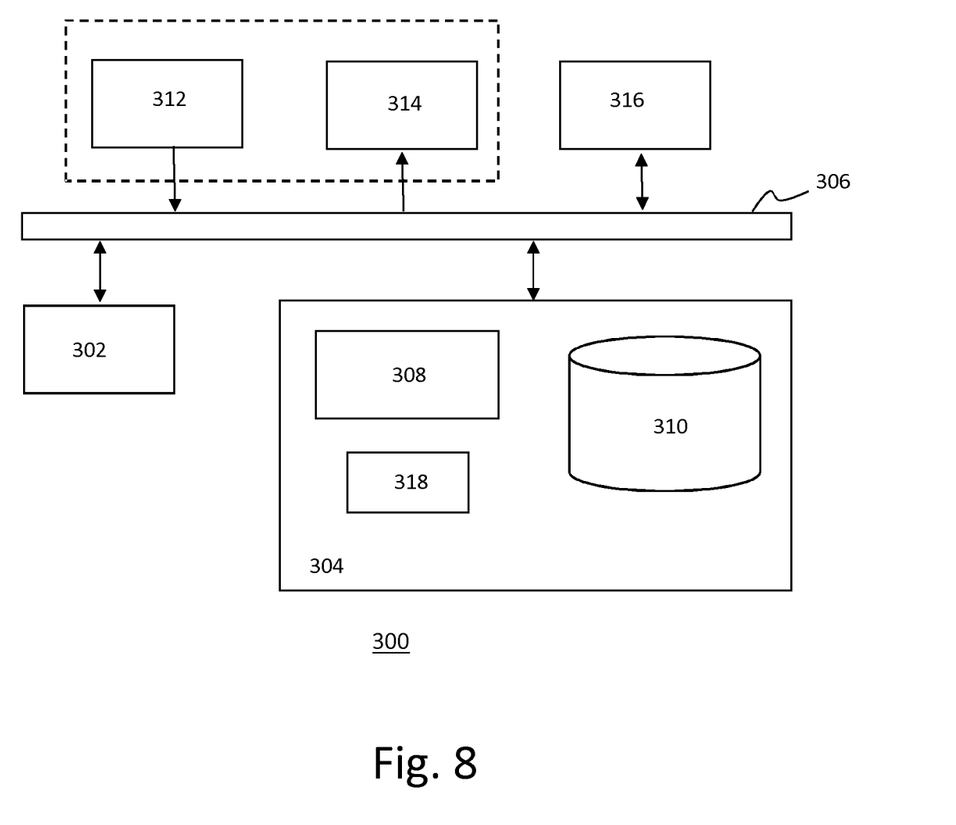
FIG. 8 is a block diagram of an exemplary data processing system for performing the methods of the invention.

FIG. 8 depicts a block diagram illustrating an exemplary data processing system that may perform the methods as described with reference to FIGS. 4 to 7.

As shown in FIG. 8, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the number of times program code must be retrieved from the bulk storage device 310 during execution.

Input/output (I/O) devices depicted as an input device 312 and an output device 314 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 8 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 8, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 17) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements described in this specification are intended to include any structure, material, or act for performing the function in combination with other claimed elements as specifically mentioned. The description of embodiments of the present invention has been presented for purposes of illustration, but is not intended to be exhaustive or limited to the implementations in the form disclosed. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for receiving an interest message, the system comprising:
   at least one communication interface;
   at least one memory; and
   at least one processor configured to:
      receive an interest message for requesting a single named data object on a first one of the at least one communication interface, the interest message comprising a name of a requested data object, at least one name component of the name of the requested data object comprising a range of names expressing an approximation of the name of the single named data object,
      determine whether the at least one memory comprises a named data object having a name falling within the range of names of the requested data object,
      provide the named data object on the first one of the at least one communication interface if the at least one memory comprises the named data object,
      forward the interest message on one or more further ones of the at least one communication interface if the at least one memory does not comprise the named data object,
      associate the name of the requested data object with an identifier of the first one of the at least one communication interface in the at least one memory if the at least one memory does not comprise the named data object;
      receive the named data object on the one or more further ones of the at least one communication interface if the at least one memory does not comprise the named data object, and forward the named data object on the first one of the at least one communication interface based on the association if the at least one memory does not comprise the named data object.

2. The system of claim 1, wherein the at least one name component comprising the range of names is followed in the name of the requested data object by at least one further name component and the at least one processor is further configured to select a subset from a plurality of communication interfaces to forward the interest message on in dependence on the at least one further name component.

3. The system of claim 1, wherein at least a first name component of the name of the requested data object comprises a first range and at least a second name component of the name of the requested data object comprises a second range.

4. The system of claim 3, wherein the first range and the second range specify values of different attributes.

5. The system of claim 3, wherein the first range and the second range specify values of the same attribute.

6. The system of claim 1, wherein the at least one processor is further configured to:

store an entry comprising association of the name of the requested data object with the identifier of the first one of the at least one communication interface in the at least one memory, receive a new data object on the one or more further ones the at least one communication interface, forward the new data object on a communication interface associated with an active entry stored in the at least one memory if a name of the new data object matches a requested data object name associated with the active entry, and remove the active entry from the at least one memory or deactivate the active entry in the at least one memory if the new data object is forwarded on the communication interface associated with the active entry.

7. A method for receiving an interest message, the method comprising:

receiving an interest message for requesting a single named data object on a first one of at least one communication interface, the interest message comprising a name of a requested data object, at least one name component of the name of the requested data object comprising a range of names expressing an approximation of the name of the single named data object;

determining whether at least one memory comprises a named data object having a name falling within the range of names of the single named data object;

providing the named data object on the first one of the at least one communication interface if the at least one memory comprises the named data object;

forwarding the interest message on one or more further ones of the at least one communication interface if the at least one memory does not comprise the named data object;

associating the name of the requested data object with an identifier of the first one of the at least one communication interface in the at least one memory if the at least one memory does not comprise the named data object;

receiving the named data object on the one or more further ones of the least one communication interface if the at least one memory does not comprise the named data object; and forwarding the named data object on the first one of the at least one communication interface based on the association if the at least one memory does not comprise the named data object.

8. The method of claim 7, wherein:

associating the name of the requested data object with an identifier of the first one of the at least one communication interface in the at least one memory comprises storing an entry comprising the association in the at least one memory;

receiving the named data object on the one or more further ones of the at least one communication interface if the at least one memory does not comprise the named data object comprises receiving a new data object on the one or more further ones of the at least one communication interface;

forwarding the named data object on the first one of the at least one communication interface based on the association if the at least one memory does not comprise the named data object comprises forwarding the new data object on a communication interface associated with an active entry stored in the at least one memory if a name of the new data object matches a requested data object name associated with the active entry; and wherein the method further comprises removing the active entry from the at least one memory or deactivating the active entry in the at least one memory if the new data object is forwarded on the communication interface associated with the active entry.

9. A non-transitory computer-readable medium having instructions stored thereon that, when executed by one or more processors of a system, cause the system to carry out operations including:

receiving an interest message for requesting a single named data object on a first one of at least one communication interface, the interest message comprising a name of a requested data object, at least one name component of the name of the requested data object named comprising a range of names expressing an approximation of the name of the single data object;

determining whether at least one memory comprises a named data object having a name falling within the range of names of the single named data object;

providing the named data object on the first one of the at least one communication interface if the at least one memory comprises the named data object;

forwarding the interest message on one or more further ones of the at least one communication interface if the at least one memory does not comprise the named data object;

associating the name of the requested data object with an identifier of the first one of the at least one communication interface in the at least one memory if the at least one memory does not comprise the named data object;

receiving the named data object on the one or more further ones of the least one communication interface if the at least one memory does not comprise the named data object; and forwarding the named data object on the first one of the at least one communication interface based on the association if the at least one memory does not comprise the named data object.

* * * * *